United States Patent
Onomatsu (10) Patent No.: US 7,657,647 B2
(45) Date of Patent: Feb. 2, 2010

(54) CLIENT SERVER SYSTEM

(75) Inventor: Takehiro Onomatsu, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 661 days.

(21) Appl. No.: 11/519,004

(22) Filed: Sep. 12, 2006

(65) Prior Publication Data
US 2007/0122107 A1    May 31, 2007

(30) Foreign Application Priority Data
Sep. 13, 2005    (JP) ............... 2005-265400

(51) Int. Cl.
*G06F 15/16* (2006.01)
(52) U.S. Cl. ............ 709/231; 709/217; 709/218; 725/145; 725/115; 725/93; 348/7; 348/12
(58) Field of Classification Search ............... 709/231, 709/217, 218; 725/145, 115, 93; 348/7, 348/12
See application file for complete search history.

(56) References Cited
U.S. PATENT DOCUMENTS
6,005,599 A * 12/1999 Asai et al. ............... 725/116

2007/0150925 A1 * 6/2007 Fujishiro ............... 725/93

FOREIGN PATENT DOCUMENTS

| JP | 8 107540 A | 4/1996 |
|---|---|---|
| JP | 11 127420 A | 5/1999 |
| JP | 2002 291065 A | 10/2002 |
| JP | 2003-209810 A | 7/2003 |

* cited by examiner

*Primary Examiner*—Thanh Tammy Nguyen
(74) *Attorney, Agent, or Firm*—Crowell & Moring LLP

(57) ABSTRACT

Disclosed is a client server system including: a server apparatus equipped with a reproduction section to reproduce accumulated video data in a predetermined reproduction mode including a normal reproduction mode, a fast-forward reproduction mode and a fast-rewind reproduction mode, and a transmission section; a client terminal apparatus equipped with a reception section, a storage section, and an output control section; a selection section to select the reproduction mode; a setting section to set a time lag; and a control section to shift a reproduction position of video data in the first reproduction mode by the time lag, when a second reproduction mode is selected.

2 Claims, 7 Drawing Sheets

CLIENT SERVER SYSTEM

BACKGROUND OF THE INVENTION

1. Field of the Invention

The present invention relates to a client server system.

2. Description of Related Art

A client server system has been conventionally known which can transmit video data reproduced with audio-video (AV) equipment (digital versatile disc (DVD)/hard disk drive (HDD) reproduction unit and the like) installed in a server apparatus from the server apparatus to a client terminal apparatus by wireless communication to output the transmitted video data to an output unit installed in the client terminal apparatus. In the client server system of this sort, because the video data is transmitted by wireless communication, the client server system has a problem of the occurrence of a transmission delay. Moreover, the video data is sometimes output to the output unit after being stored in a buffer installed in the client terminal apparatus in preparation for interruption of transmission or for convenience of processing, and there exists a problem of the occurrence of a further time lag from the reproduction of the video data to the output thereof.

Figure 7:
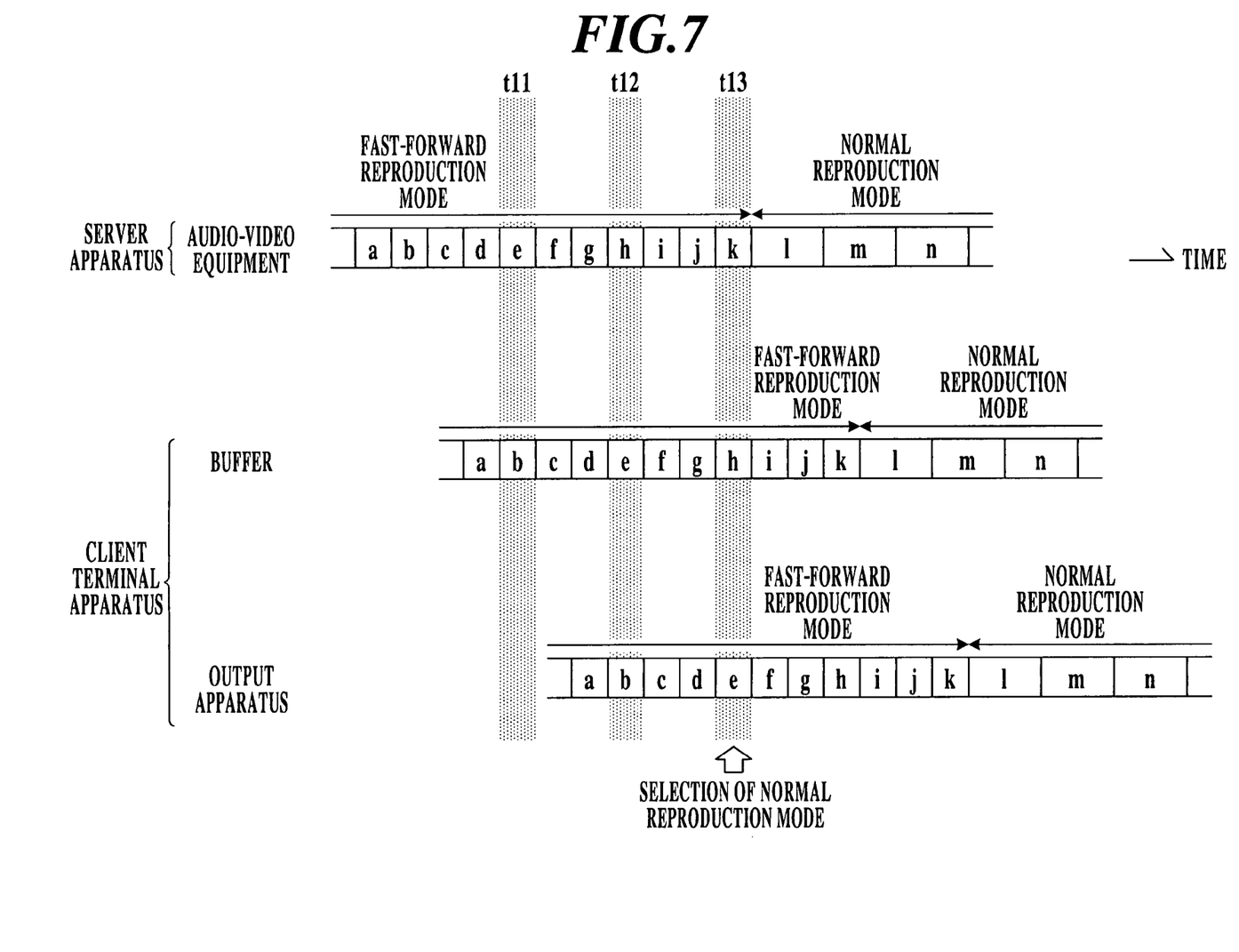
FIG. 7 is a view for illustrating the reproduction method of video data by a conventional client server system.

For instance, as shown in FIG. 7, video data a, b, c . . . reproduced by the AV equipment is wirelessly transmitted to the client terminal apparatus, and stored in the buffer. After that, the video data a, b, c . . . is output to the output unit.

To put it concretely, for example, at a time point [t13], the AV equipment reproduces the video data k in a fast-forward reproduction mode; the buffer stores the video data h reproduced by the AV equipment at a time point [t12]; and the output unit outputs the video data e, which has been reproduced at a time point [t11] by the AV equipment and stored in the buffer at the time point [t12].

It is assumed that a signal instructing a selection of a normal reproduction mode as a reproduction mode of the AV equipment is transmitted from a remote controller (hereinafter referred to as a "remote control") for the server apparatus, which remote control is operated by a user at the time point [t13] in the reproduction operation by the AV equipment in the fast-forward reproduction mode. That is, it is supposed that the user wants to watch the video based on the video data following the video data e (the video data on and after the video data f) in the normal reproduction mode. The server apparatus, which has received the signal transmitted from the remote control, controls the AV equipment to change the reproduction mode thereof from the fast-forward reproduction mode to the normal reproduction mode. That is, because the AV equipment changes its reproduction mode to the normal reproduction mode immediately after the time point [t13], the AV equipment reproduces the video data on and after the video data 1 in the normal reproduction mode. Consequently, there is a problem in which the video data desired by the user (the video data on and after the video data f) cannot be reproduced in the reproduction mode desired by the user (normal reproduction mode).

Accordingly, a method of adding time information to video data was proposed for instance (see, for instance, JP 2003-209810A).

To put it concretely, for instance, a server apparatus (a moving video transmission apparatus) adds the time information (counter values or the like) to the video data reproduced by AV equipment (video reproduction means), and transmits the time information-added video data to a client terminal apparatus (video reception means). Then, when a remote control for the client terminal apparatus is operated by a user to instruct a switch of the reproduction mode of the video data, the client terminal apparatus acquires the time information from the video data output at the time point of the instruction by an output unit (video display means) to transmit the time information to the server apparatus. The server apparatus calculates the quantity of the video data to be returned, and makes the AV equipment reproduce the video data from the point corresponding to the return quantity.

Furthermore, for instance, in the case where a reproduction start position of video data was specified by the operation of a slider displayed on an output unit, a method of associating a shifting quantity of the knob of the slider with the video data was proposed (see, for instance, JP Hei 11-127420A). To put it concretely, still image data of the video data having smaller quantity of data than that of the video data has been associated with the shifting quantity of the knob of the slider to be stored in a server apparatus (video transmitter) in advance. Then, when a user specifies a reproduction start position of the video data by moving the knob of the slider displayed on the output unit (an video and sound output unit), the client terminal apparatus (the video receiver) transmits the shifting quantity of the knob to the server apparatus. The server apparatus acquires the still image data equivalent to the transmitted shifting quantity of the knob out of the stored still image data to transmit the acquired still image data to the client terminal apparatus, and begins the reproduction of the video data from the position corresponding to the still image data.

Moreover, a method of making an output unit output a still image when a pause was instructed, for instance, was also proposed (see, for instance, JP 2002-291065A).

To put it concretely, for instance, when a user operates a remote control for a client terminal apparatus (a reception unit) to instruct a pause of an video based on video data, which video is output by an output unit (a liquid crystal monitor), the client terminal apparatus transmits the instruction to a server apparatus (a transmission unit), and makes the output unit output the still image based on the video data output at the time point of the instruction.

Moreover, a method of not settling any transmission delay owing to wireless communication but of settling a delay of AV equipment (a compressed video reproduction apparatus) at the time of compressed video data reproduction after performing fast-forwarding or rewinding was also proposed (see, for instance, JP Hei 8-107540A).

However, it is necessary to perform Moving Picture Experts Group (MPEG) coding processing to video data to add time information to the video data like the method of, for instance, JP 2003-209810A. That is, the method of JP 2003-209810A is effective only when video data is coded by MPEG coding and transmitted.

Moreover, the method of JP Hei 11-127420A is effective only when a reproduction start position of video data is specified with the slider.

Furthermore, the method of, for instance, JP 2002-291065A is effective only when a pause instruction is issued.

Moreover, the method of, for instance, JP Hei 8-107540A is effective only when video data is not transmitted by wireless communication.

Consequently, any of the methods disclosed in JP 2003-209810A, JP Hei 11-127420A, JP 2002-291065A and JP 8-107540A are effective only in limited cases, and their uses are limited.

SUMMARY OF THE INVENTION

It is an object of the present invention to provide a client server system capable of achieving to prevent more versatilely the troubles of user's watching caused by a delay occurring at the time of the transmission of video data in the client server system.

According to a first aspect of the present invention, a client server system comprises a server apparatus equipped with a reproduction section to reproduce accumulated video data in a predetermined reproduction mode including a normal reproduction mode, a fast-forward reproduction mode and a fast-rewind reproduction mode, and a transmission section to transmit the video data reproduced by the reproduction section; a client terminal apparatus connected with the server apparatus through a wireless network equipped with a reception section to receive the video data transmitted by the transmission section, a storage section to store the video data received by the reception section sequentially, and an output control section to output the video data stored in the storage section to a display unit; a selection section to select the reproduction mode of the reproduction section; a setting section to set a time lag; and a control section to shift a reproduction position of video data in the first reproduction mode by the time lag set by the setting section, when a second reproduction mode is selected by the selection section during a reproduction operation by the reproduction section in the first reproduction mode, wherein the setting section comprises a setting screen display control section to allow the display unit to display a setting screen, and an input section to input the time lag into an input space displayed in the setting screen.

Consequently, the setting section can set the time lag, and the control section can shift the reproduction position of the video data in the first reproduction mode by the time lag set by the setting section, when the second reproduction mode is selected by the selection section during the reproduction operation by the reproduction section in the first reproduction mode. That is, because the reproduction position of the video data can be shifted to the reproduction position which the user desires and the video data can be reproduced from the reproduction position which the user desires in the reproduction mode which the user desires, the trouble prevention of the watching of the user, the trouble being caused by the delay generated at the time of the transmission of the video data in the client server system, can be achieved more versatilely.

Moreover, the setting screen can be displayed on the display unit by the setting screen display control section installed in the setting section, and the time lag can be input into the input space displayed on the setting screen with the input section installed in the setting section. Consequently, even if the time lag is different to each client server system owing to the individual differences of the client server systems for instance, the user can adjust and set the time lag fitted to the client server system owned by the user himself or herself. Consequently, the trouble prevention of the watching of the user the trouble being caused at the time of the transmission of the video data in the client server system can be achieved more effectively.

According to a second aspect of the present invention, a client server system comprises a server apparatus equipped with a reproduction section to reproduce accumulated video data in a predetermined reproduction mode including a normal reproduction mode, a fast-forward reproduction mode and a fast-rewind reproduction mode, and a transmission section to transmit the video data reproduced by the reproduction section; a client terminal apparatus connected with the server apparatus through a wireless network equipped with a reception section to receive the video data transmitted by the transmission section, a storage section to store the video data received by the reception section sequentially, and an output control section to output the video data stored in the storage section to a display unit; a selection section to select the reproduction mode of the reproduction section; a setting section to set a time lag; and a control section to shift a reproduction position of video data in the first reproduction mode by the time lag set by the setting section, when a second reproduction mode is selected by the selection section during a reproduction operation by the reproduction section in the first reproduction mode, wherein the setting section comprises a measurement section to measure a time period from reproduction of the video data by the reproduction section to input of the video data into an external input unit through a communication section, the measurement section including: an external output unit installed in the client terminal apparatus, to output the video data output by the output control section to an outside; the external input unit installed in the server apparatus, to input video data output by the external output unit; and the communication section to connect the external output unit with the external input unit, wherein the setting section sets the time period measured by the measurement section as the time lag.

Consequently, the setting section can set the time lag, and the control section can shift the reproduction position of the video data in the first reproduction mode by the time lag set by the setting section, when the second reproduction mode is selected by the selection section during the reproduction operation by the reproduction section in the first reproduction mode. That is, because it is possible to shift the reproduction position to the position which the user desires, and to reproduce the video data in the reproduction mode which the user desires from the reproduction position which the users desires, the trouble prevention of the user's watching, the trouble being caused by the delay occurring at the time of the transmission of the video data in the client server system, can be more versatilely achieved.

Furthermore, the measurement section installed in the setting section can measure the time period from reproduction of the video data by the reproduction section to input of the video data into the external input unit through the communication section as the time lag. That is, because the time lag which the user feels actually at the time of the watching of the user can be directly measured to be set, it is possible to achieve the trouble prevention of the user's watching, the trouble being caused by the delay occurring at the time of the transmission of the video data in the client server system.

According to a third aspect of the present invention, a client server system comprises a server apparatus equipped with a reproduction section to reproduce accumulated video data in a predetermined reproduction mode including a normal reproduction mode, a fast-forward reproduction mode and a fast-rewind reproduction mode, and a transmission section to transmit the video data reproduced by the reproduction section; a client terminal apparatus connected with the server apparatus through a wireless network equipped with a reception section to receive the video data transmitted by the transmission section, a storage section to store the video data received by the reception section sequentially, and an output control section to output the video data stored in the storage section to a display unit; a selection section to select the reproduction mode of the reproduction section; a setting section to set a time lag; and a control section to shift a reproduction position of video data in the first reproduction mode by the time lag set by the setting section, when a second reproduction mode is selected by the selection section during a reproduction operation by the reproduction section in the first reproduction mode.

Consequently, the setting section can set the time lag, and the control section can shift the reproduction position of the video data in the first reproduction mode by the time lag set by the setting section, when the second reproduction mode is selected by the selection section during the reproduction operation by the reproduction section in the first reproduction mode. That is, because the reproduction position can be shifted to the reproduction position which the user desires to reproduce the video data in the reproduction mode which the user desires from the reproduction position which the user desires, it is possible to achieve the trouble prevention of the user's watching, the trouble being caused by the delay occurring at the time of the transmission of the video data in the client server system, more versatilely.

Preferably, the setting section is provided with a measurement section to measure a time period from reproduction of the video data by the reproduction section to input of the video data into an external input unit through a communication section as the time lag.

Consequently, it is a matter of course that the similar advantages of the third aspect of the present invention can be acquired, and further it is possible to measure the time period from reproduction of the video data by the reproduction section to input of the video data into the external input unit through the communication section as the time lag with the measurement section installed in the setting section. Consequently, because, for instance, even if the time lag differs from each other in each client server system owing to the individual differences of the client server systems, the time period of each client server system can be measured as the time lag to be set to each client server system, the trouble prevention of the user's watching, the trouble being caused by the delay occurring at the time of the transmission of the video data in the client server system, can be more effectively achieved.

BRIEF DESCRIPTION OF THE DRAWINGS

The present invention will be understood more completely from the detailed description shown in the following and the attached drawings. However, these are not intended to limit the sphere of the present invention, in which.

DETAILED DESCRIPTION OF THE INVENTION

An embodiment of the present invention will be described in detail hereinbelow with reference to drawings. However, the scope of the invention shall not be limited to examples shown in drawings.

First Embodiment

First, a client server system 1000 according to a first embodiment is described.

<Configuration of Client Server System>

Figure 1:
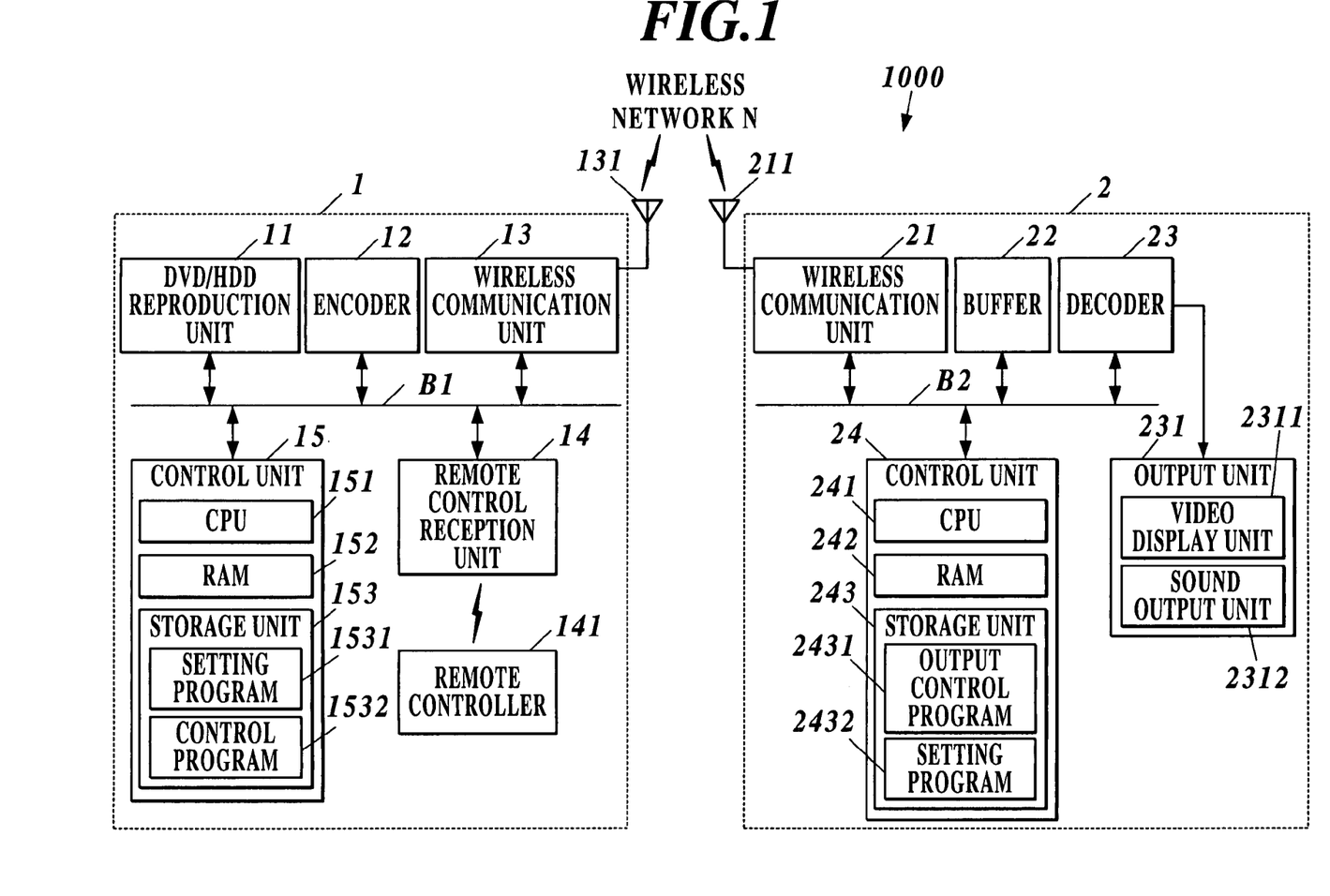
FIG. 1 is a diagram showing the whole configuration of a client server system according to a first embodiment.

First, the configuration of the client server system 1000 is described, referring to FIG. 1.

The client server system 1000 is composed of a server apparatus 1 and a client terminal apparatus 2. The server apparatus 1 and the client terminal apparatus 2 are connected with each other through a wireless network N to be possible to perform communication with each other.

The wireless network N is a network such as a wireless local area network (LAN) in conformity with, for instance, Institute of Electrical and Electronic Engineers (IEEE) 802.11 standards and the like.

(Configuration of Server Apparatus)

The server apparatus 1 is composed of a DVD/HDD reproduction unit 11, an encoder 12, a wireless communication unit 13, a remote control reception unit 14, a control unit 15 and the like, as shown in FIG. 1 for instance. Each unit is connected with each other through a bus B1. Moreover, the sever apparatus 1 is also provided with a remote controller 141 (hereinafter also referred to as a "remote control 141") for the server apparatus 1.

The DVD/HDD reproduction unit 11, for instance, reproduces the video data accumulated in a DVD or a HDD in a predetermined reproduction mode in conformity to an instruction from the control unit 15 as a reproduction section.

Hereupon, the predetermined reproduction mode includes a normal reproduction mode, a fast-forward reproduction mode, a fast-rewind reproduction mode, a pause reproduction mode and the like.

The encoder 12, for instance, encodes the video data reproduced by the DVD/HDD reproduction unit 11 in conformity to an instruction from the control unit 15.

The wireless communication unit 13 includes an antenna 131 and the like, and performs communications with a wireless communication unit 21 (which will be described later) of the client terminal apparatus 2 through the wireless network N.

To put it concretely, the wireless communication unit 13 transmits the video data that has been reproduced by the DVD/HDD reproduction unit 11 and has been encoded by the encoder 12 in conformity to an instruction from the control unit 15 to the wireless communication unit 21 (which will be described later) of the client terminal apparatus 2, as a transmission section for instance.

The remote control reception unit 14, for instance, receives various signals transmitted from the remote control 141.

The remote control 141, for instance, is used when a user selects a reproduction mode by the DVD/HDD reproduction unit 11 as a selection section.

Moreover, the remote control 141, for instance, is used when the user inputs a predicted time lag into an input space S1 displayed on a setting screen S (see, for instance, FIG. 2) as a setting section and an input section.

The control unit 15, for instance, is composed of a central processing unit (CPU) 151, a random access memory (RAM) 152, a storage unit 153 and the like as shown in FIG. 1.

The CPU 151 performs various control operations in conformity to various processing programs for the server apparatus 1 which programs are stored in the storage unit 153.

The RAM 152 is equipped with a program storage region for expanding a processing program executed by the CPU 151 and the like, a data storage region for storing input data, processed results generated at the time of the execution of the processing program, and the like.

The storage unit 153 stores a system program executable in the server apparatus 1, various processing programs executable on the system program, the data used at the time of the execution of the various processing programs, the data of the processed results operated and processed by the CPU 151, and the like. In addition, the programs are stored in the storage unit 153 in the form of the program codes which a computer can read.

To put it concretely, the storage unit. 153 stores a setting program 1531, a control program 1532 and the like, as shown in FIG. 1 for instance.

The setting program 1531 makes the CPU 151 realize the function of setting a time lag (a predicted time lag), which is predicted by the user, from the reproduction of the video data by the DVD/HDD reproduction unit 11 to output of the video data to an video display unit 2311 (which will be described later) and the like included in an output unit 231 of the client terminal apparatus 2.

To put it concretely, the CPU 151 makes the storage unit 153 store the predicted time lag input by an operation of the remote control 141 by a user, for instance, and transmits the predicted time lag to the client terminal apparatus 2 through the wireless communication unit 13.

The CPU 151 functions as the setting section by executing the setting program 1531 like this.

The control program 1532 makes the CPU 151 realize the function of processing of shifting the reproduction position of video data to the reproduction position in a first reproduction mode, the latter reproduction position equivalent to the set time lag (the predicted time lag) by being stored in the storage unit 153 by the CPU 151 having executed the setting program 1531, when a second reproduction mode is selected by a user's operation of the remote control 141 during a reproduction operation by the DVD/HDD reproduction unit 11 in the first reproduction mode.

Hereupon, the first reproduction mode is, for instance, the normal reproduction mode, the fast-forward reproduction mode, the fast-rewind reproduction mode and the like. Moreover, the second reproduction mode is a reproduction mode different from the first reproduction mode, for instance, the normal reproduction mode, the pause reproduction mode and the like.

The CPU 151 functions as a control section by executing the control program 1532 like this.

(Configuration of Client Terminal Apparatus)

The client terminal apparatus 2 is composed of the wireless communication unit 21, a buffer 22, a decoder 23 connected with the output unit 231, a control unit 24 and the like, as shown in FIG. 1 for instance. Each unit is connected with each other with a bus B2.

The wireless communication unit 21 includes an antenna 211 and the like, and performs communication with the wireless communication unit 13 of the server apparatus 1 through the wireless network N.

To put it concretely, the wireless communication unit 21 receives the video data transmitted from the wireless communication unit 13 of the server apparatus 1 as a reception section for instance.

The buffer 22 sequentially stores the video data received by the wireless communication unit 21 in conformity to an instruction from the control unit 24, for instance as a storage section.

The decoder 23 decodes the video data stored in the buffer 22 to output the decoded video data to the output unit 231 in conformity to an instruction from the control unit 24, for instance.

The output unit 231 includes the video display unit 2311, a sound output unit 2312 and the like, for instance.

The video display unit 2311 is a liquid crystal display unit or the like, and displays an video based on the video data decoded by the decoder 23, as a display unit for instance.

The sound output unit 2312 is speaker equipment or the like, and outputs the sounds based on the video data decoded by the decoder 23, for instance.

The control unit 24 is composed of a CPU 241, a RAM 242, a storage unit 243 and the like as shown in FIG. 1 for instance.

The CPU 241 performs various control operations in conformity to various processing programs for the client terminal apparatus 2, which programs are stored in the storage unit 243.

The RAM 242 includes a program storage region for expanding a processing program and the like, which are executed by the CPU 241, a data storage region storing input data, processed results generated at the time of the execution of the processing program and the like, and the like.

The storage unit 243 stores a system program executable in the client terminal apparatus 2, various processing programs executable on the system program, the data used at the time of the execution of the various processing programs, the data of the processed results operated and processed by the CPU 241, and the like. In addition, the programs are stored in the storage unit 243 in the form of the program codes readable by a computer.

To put it concretely, the storage unit 243 stores an output control program 2431, a setting program 2432 and the like as shown in FIG. 1 for instance.

The output control program 2431 makes the CPU 241 realize the function of decoding the video data stored in the buffer 22 with the decoder 23 to output the decoded video data to the video display unit 2311 included in the output unit 231.

The CPU 241 functions as an output control section by executing the output control program 2431 like this.

The setting program 2432 makes the CPU 241 realize the function of setting the time lag (the predicted time lag), which the user predicted, from the reproduction of the video data by the DVD/HDD reproduction unit 11 to output of the video data to the video display unit 2311 and the like included in the output unit 231 by the CPU 241, which has executed the output control program 2431.

To put it concretely, the CPU 241 makes the video display unit 2311 display the setting screen S (see FIG. 2) to set the predicted time lag for instance.

Figure 2:
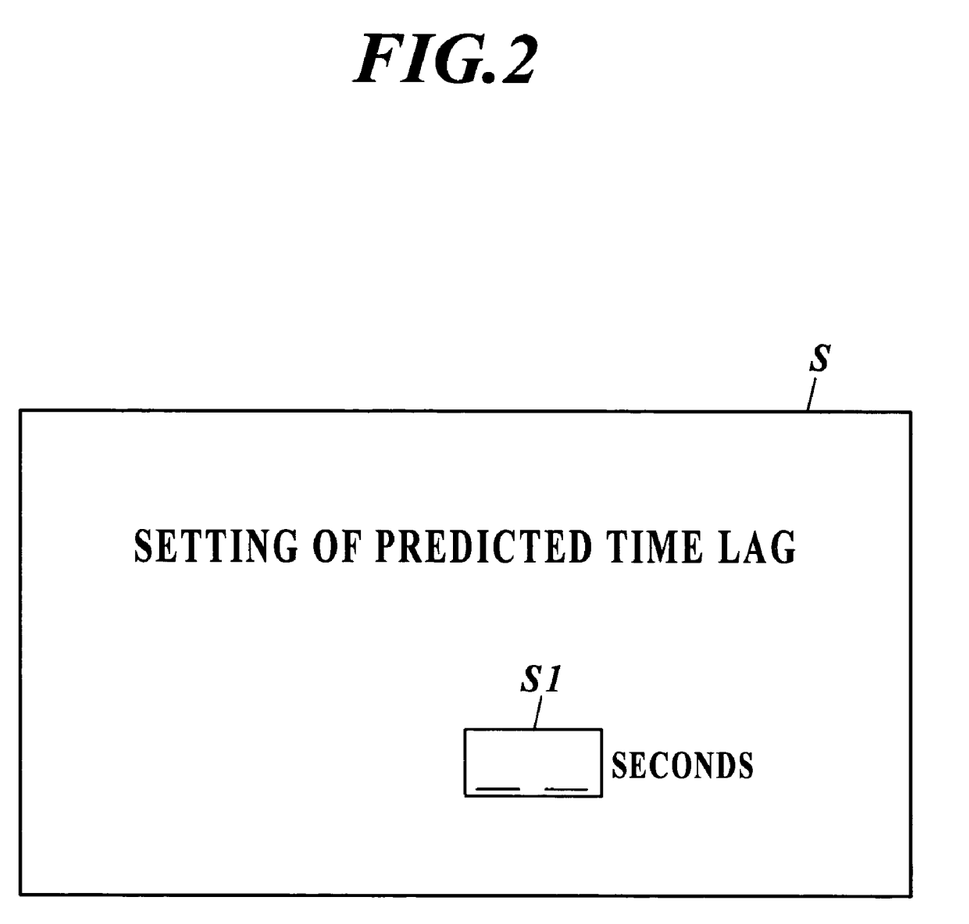
FIG. 2 is a view showing a.setting screen to set a predicted time lag.

The CPU 241 functions as the setting section and a setting screen display control section by executing the setting program 2432 like this.

<Predicted Time Lag Setting Processing>

Next, the processing relative to the setting of the predicted time lag by the client server system 1000 is described.

First, for instance, when the user operates the remote control 141 to instruct the client server system 1000 to display the setting screen S (see FIG. 2) for setting the predicted time lag on the video display unit 2311 included in the output unit 231 of the client terminal apparatus 2, the CPU 151 of the server apparatus 1 executes the setting program 1531 to transmit a setting screen display instruction to the client terminal apparatus 2 through the wireless communication unit 13.

Next, when the wireless communication unit 21 of the client terminal apparatus 2 receives the transmitted setting screen display instruction, the CPU 241 of the client terminal apparatus 2 executes the setting program 2432 to make the video display unit 2311 display the setting screen S (see FIG. 2) for setting the predicted time lag.

Then, when the user, who saw the displayed setting screen S (see FIG. 2), inputs a predicted time lag by operating the remote control 141, for instance, the CPU 151 of the server apparatus 1 executes the setting program 1531 to make the storage unit 153 store the input predicted time lag, and to transmit the input predicted time lag to the client terminal apparatus 2 through the wireless communication unit 13.

Next, when the wireless communication unit 21 of the client terminal apparatus 2 receives the transmitted predicted time lag, the CPU 241 of the client terminal apparatus 2 executes the setting program 2432 to output the received predicted time lag to the output unit 231, and makes the output unit 231 perform input display into the input space S1 displayed in the setting screen S (see FIG. 2) displayed on the video display unit 2311.

<Reproduction Position Movement Processing>

Next, the processing relative to the shifting of a reproduction position of video data by the client server system 1000 is described with reference to FIG. 3.

Image data a, b, c, . . . , which has been reproduced by the DVD/HDD reproduction unit 11, are wirelessly transmitted from the server apparatus 1 to the client terminal apparatus 2, and are stored in the buffer 22 to be output from the output unit 231.

Figure 3:
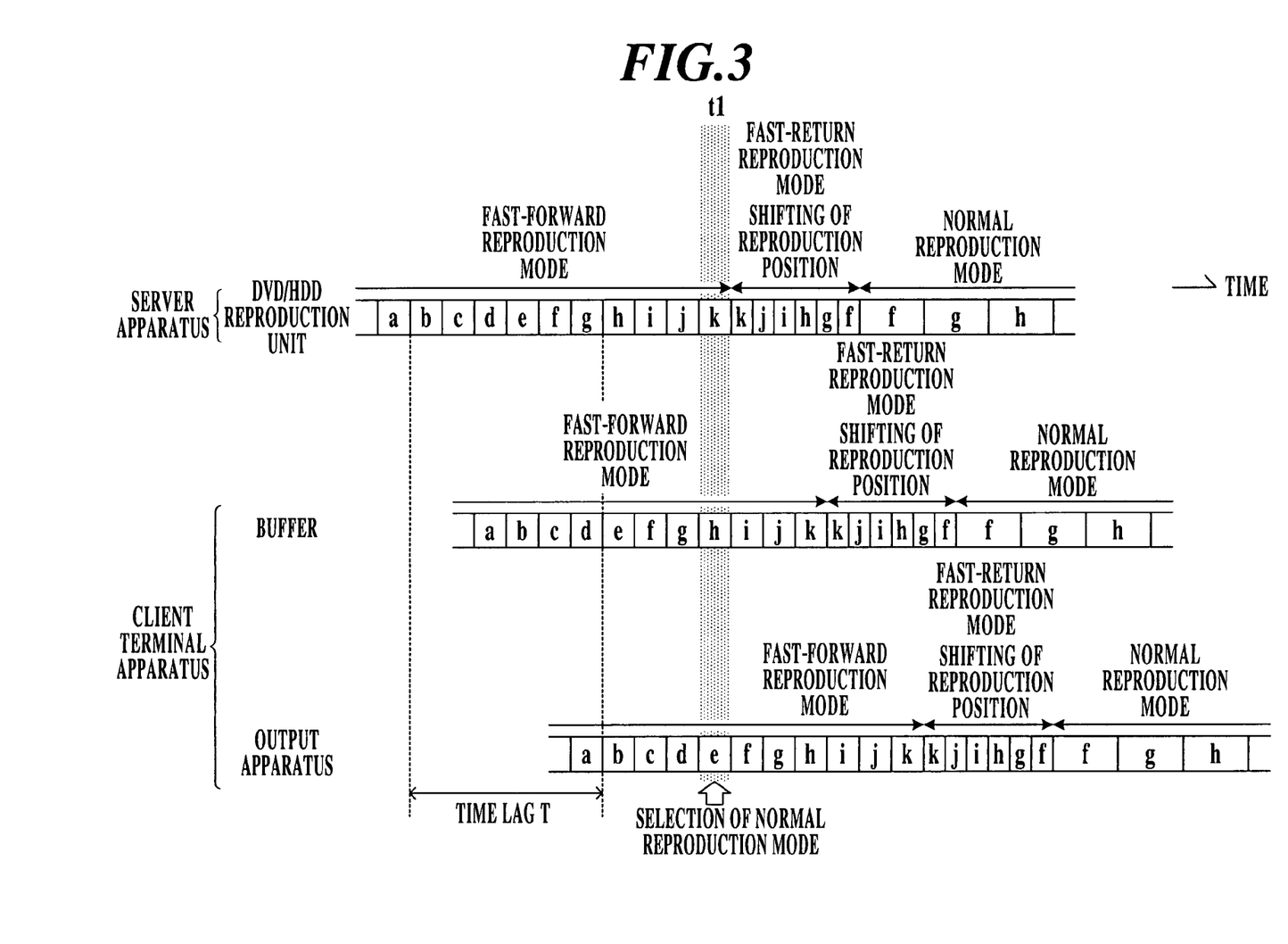
FIG. 3 is a view for illustrating the processing relative to the shifting of a reproduction position of video data by the client server system according to the first embodiment.

In FIG. 3, description is given to a case where the second reproduction mode (the normal reproduction mode) is selected by a user's operation of the remote control 141 during a reproduction operation by the DVD/HDD reproduction unit 11 in the first reproduction mode (the fast-forward reproduction mode).

To put it concretely, description is given to the case where the normal reproduction. mode is selected by a user's operation of the remote control 141 at the time point [t1] when the DVD/HDD reproduction unit 11 reproduces the video data k in the fast-forward reproduction mode and the output unit 231 outputs the video data e reproduced in the fast-forward reproduction mode, namely the case where the user wants to watch the video based on the video data following the video data e (the video data on and after the video data f) in the normal reproduction mode.

In addition, as a premise, it is supposed that the set predicted time lag, i.e. the predicted time lag stored in the storage unit 153, is consistent with the actual time lag T.

Here, in FIG. 3, the DVD/HDD reproduction unit 11 has reproduced six pieces of video data (the video data b-g) in the fast-forward reproduction mode during the period equivalent to the time lag T (=the predicted time lag) which is from the reproduction of the video data (for instance, the video data a) by the DVD/HDD reproduction unit 11 to output thereof to the output unit 231.

When the normal reproduction mode is selected by the user's operation of the remote control 141 at the time point [t1] during the reproduction operation by the DVD/HDD reproduction unit 11 in the fast-forward reproduction mode, the CPU 151 of the server apparatus 1 executes the control program 1532 to control the DVD/HDD reproduction unit 11 to shift the reproduction position of the video data to a position six pieces of the video data (the video data k, j, i, h, g, f) returned from the video data k. That is, the pieces of the video data of from the video data k to the video data f are reproduced in the fast-rewind reproduction mode, and the video data on and after the video data f are reproduced in the normal reproduction mode.

In addition, because the reproduction speeds change according to the kinds of the reproduction modes, the number of the pieces of the video data to be reproduced during a period equivalent to the time lag T changes according to the kinds of the reproduction modes. Consequently, the shifting distance of the reproduction position also changes according to the kind of the first reproduction mode.

According to the client server system 1000 of the present invention described above, the client server system 1000 is composed of the server apparatus 1 including the DVD/HDD reproduction unit 11 reproducing accumulated video data in a predetermined reproduction mode including the normal reproduction mode, the fast-forward reproduction mode, the fast-rewind reproduction mode and the pause reproduction mode, and the wireless communication unit 13 transmitting the video data reproduced by the DVD/HDD reproduction unit 11; and the client terminal apparatus 2 connected to the server apparatus 1 through the wireless network N including the wireless communication unit 21 receiving the video data transmitted from the wireless communication unit 13, the buffer 22 sequentially storing the video data received by the wireless communication unit 21, and the CPU 241 executing the output control program 2431 to make the buffer 22 output the video data stored in the buffer 22 to the video display unit 2311 and the like included in the output unit 231. Then, the user can select a reproduction mode by the DVD/HDD reproduction unit 11 by operating the remote control 141 for the server apparatus 1, and the CPU 151 having executed the setting program 1531 of the server apparatus 1 and the CPU 241 having executed the setting program 2432 of the client terminal apparatus 2 can set the time lag (the predicted time lag), which has been predicted by the user, from the reproduction of the video data by the DVD/HDD reproduction unit 11 to output of the video data to the video display unit 2311 and the like included in the output unit 231 by the CPU 241 having executed the output control program 2431. The CPU 151 having executed the control program 1532 of the server apparatus 1 controls the DVD/HDD reproduction unit 11 to enable performing the processing of shifting the reproduction position of the video data to the reproduction position in the first reproduction mode, the latter reproduction position equivalent to the predicted time lag set by the CPU 151 having executed the setting program 1531 and the CPU 241 having executed the setting program 2432, when the second reproduction mode is selected by the user's operation of the remote control 141 during the reproduction operation by the DVD/HDD reproduction unit 11 in the first reproduction mode. That is, because the client server system 1000 can shift the reproduction position to the reproduction position which the user desires to reproduce the video data, and can reproduce the video data from the reproduction position which the user desires in the reproduction mode which the user desires, the trouble prevention of the user's watching, the trouble being caused by the delay occurring at the time of the transmission of the video data in the client server system 1000, can be more versatilely achieved.

Furthermore, it is possible to make the video display unit 2311 display the setting screen S to set the predicted time lag by the CPU 241 having executed the setting program 2432, and the predicted time lag can be input into the input space S1 displayed on the setting screen S by the user's operation of the remote control 141. Consequently, for instance, even if the time lag T differs by each client server system 1000 owing to the individual differences of the client server systems 1000, the user can adjust and set the predicted time lag fitted to the time lag T of the client server system 1000 which the user owns.

Consequently, the trouble prevention of the user's watching, the trouble being caused by the delay occurring at the time of the transmission of the video data in the client sever system 1000, can be more effectively achieved.

Second Embodiment

Next, a client server system 3000 according to a second embodiment is described.

<Configuration of Client Server System>

First, the configuration of the client server system 3000 is described with reference to FIG. 4.

In addition, the time lag to be set in the client server system 3000 of the second embodiment differs from that of the client server system 1000 (see FIG. 1) of the first embodiment. To put it concretely, the client server system 3000 differs from the client server system 1000 in a part of the configuration of the server apparatus 1, the remote control 141 and a part of the configuration of the remote control reception unit 14 in the server apparatus 1, a part of the configuration of the control unit 15 in the server apparatus 1, a part of the configuration of the client terminal apparatus 2, and a part of the configuration of the control unit 24 in the client terminal apparatus 2. Accordingly, description is given only to the different parts, and the other common parts are severally denoted by the common reference numbers, and the detailed description of the common parts is omitted.

The client server system 3000 is composed of a server apparatus 3 and a client terminal apparatus 4. The server apparatus 3 and the client terminal apparatus 4 are connected with each other through the wireless network N, and are configured to be able to communicate with each other.

(Configuration of Server Apparatus)

Figure 4:
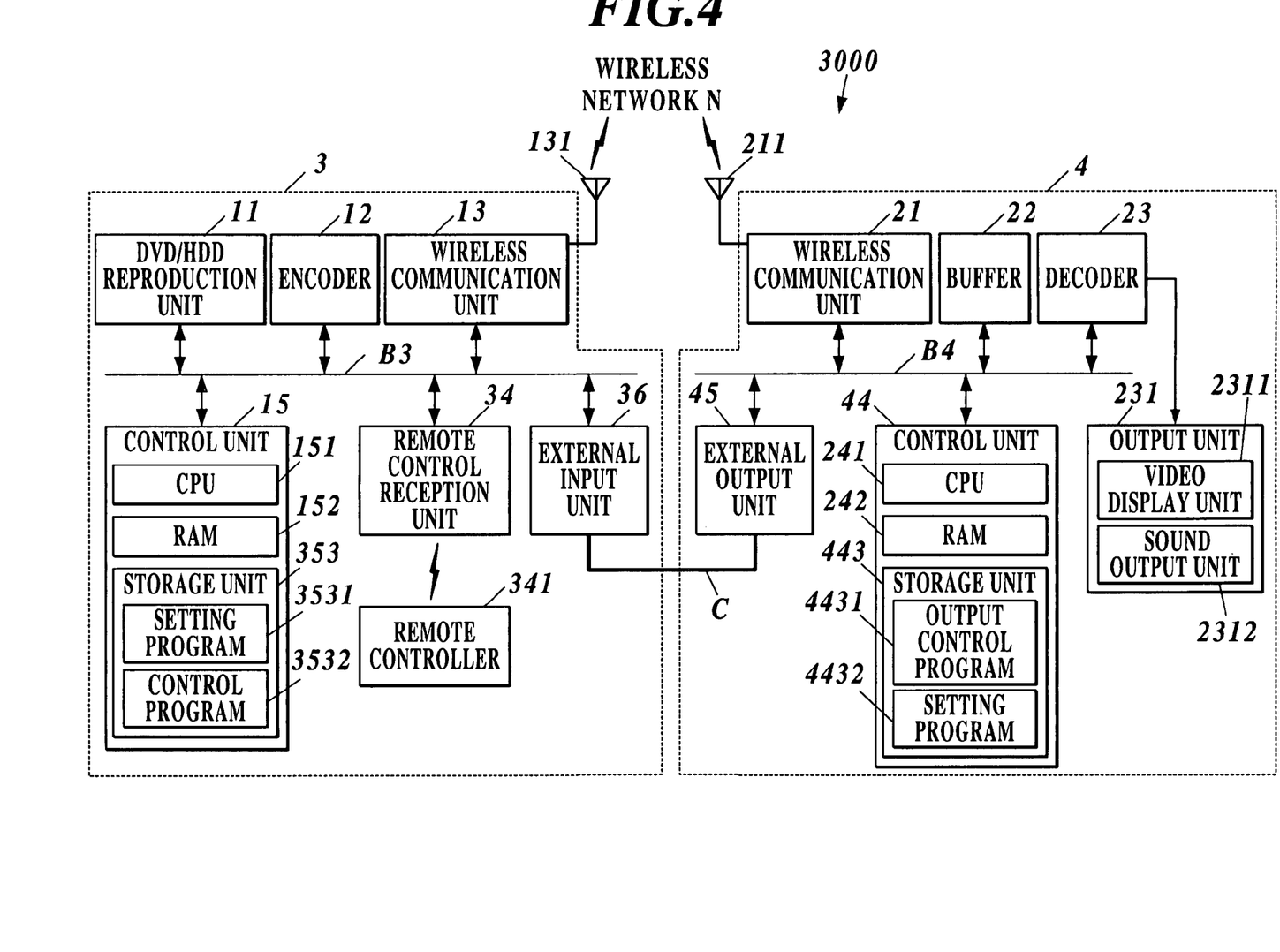
FIG. 4 is a diagram showing the whole configuration of a client server system according to a second embodiment.

The server apparatus 3 is composed of the DVD/HDD reproduction unit 11, the encoder 12, the wireless communication unit 13, a remote control reception unit 34, a control unit 35, an external input unit 36 and the like as shown in FIG. 4 for instance. Each unit is connected with each other through a bus B3. Moreover, the server apparatus 3 is also equipped with a remote controller 341 (hereinafter referred to as a "remote control 341") for the server apparatus 3.

The remote control reception unit 34 receives various signals transmitted from the remote control 341, for instance.

The remote control 341 is used when a user selects a reproduction mode by the DVD/HDD reproduction unit 11, for instance as the selection section.

The control unit 35 includes the CPU 151, the RAM 152, a storage unit 353 and the like as shown in FIG. 4 for instance.

The storage unit 353 stores a system program executable in the server apparatus 3, various processing programs executable on the system program, the data to be used at the time of the execution of the various processing programs, the data of the processed results of the operation processing by the CPU 151, and the like. In addition, the programs are stored in the storage unit 353 in the form of program codes readable by a computer.

To put it concretely, the storage unit 353 stores a setting program 3531, a control program 3532 and the like as shown in FIG. 4, for instance.

The setting program 3531 makes the CPU 151 realize the function of measuring the time lag and of setting the time lag which has been measured (measured time lag).

To put it concretely, for instance, the CPU 151 measures a time period until a piece of video data reproduced by the DVD/HDD reproduction unit 11 is input into the external input unit 36 through a cable C (which will be described later) as a measured time lag, and makes the storage unit 353 store the measured time lag therein.

The CPU 151 functions as a setting section and a measurement section by executing the setting program 3531 like this.

The control program 3532 makes the CPU 151 realize the function of processing of shifting the reproduction position of video data to the reproduction position in the first reproduction mode, the latter reproduction position equivalent to the set time lag (the measured time lag) by being stored in the storage unit 353 by the CPU 151 having executed the setting program 3531, when the second reproduction mode is selected by a user's operation of the remote control 341 during the reproduction operation by the DVD/HDD reproduction unit 11 in the first reproduction mode.

Hereupon, the first reproduction mode is, for instance, the normal reproduction mode, the fast-forward reproduction mode, the first-rewind reproduction mode and the like. Moreover, the second reproduction mode is a reproduction mode different from the first reproduction mode, and for instance, the normal reproduction mode, the pause reproduction mode and the like.

The CPU 151 functions as the control section by executing the control program 3532 like this.

The external input unit 36 is connected with an external output unit 45 (which will be described later) of the client terminal apparatus 4 with the cable C as the setting section, the measurement section and a communication section.

To put it concretely, the external input unit 36, for instance, inputs therein the video data output by the external output unit 45 of the client terminal apparatus 4 through the cable C as the setting section and the measurement section.

(Configuration of Client Terminal Apparatus) For instance, as shown in FIG. 4, the client terminal apparatus 4 is composed of the wireless communication unit 21, the buffer 22, the decoder 23 connected with the output unit 231, a control unit 44, the external output unit 45 and the like.

The control unit 44 is equipped with the CPU 241, the RAM 242, a storage unit 443 and the like as shown in FIG. 4 for instance.

The storage unit 443 stores a system program executable in the client terminal apparatus 4, various processing programs executable on the system program, the data used at the time of the execution of the various processing programs, the data of the processed results of the operation processing by the CPU 241, and the like. In addition, the programs are stored in the storage unit 443 in the form of program codes readable by a computer.

To put it concretely, for instance as shown in FIG. 4, the storage unit 443 stores an output control program 4431, a setting program 4432 and the like.

The output control program 4431 makes the CPU 241 realize the function of decoding the video data stored in the buffer 22 with the decoder 23 to output the decoded video data to the video display unit 2311 and the like included in the output unit 231 and to the external output unit 45.

The CPU 241 functions as the output control section by executing the output control program 4431 like this.

The setting program 4432 makes the CPU 241 realize the function of measuring a time period from the reproduction of the video data by the DVD/HDD reproduction unit 11 to output of the video data to the video display unit 2311 and the like included in the output unit 231 as the time lag by the CPU 241 having executed the output control program 4431 and of setting the time lag which has been measured (the measured time lag).

To put it concretely, the CPU 241 performs an external output of the video data from the external output unit 45, the video data having been output to the external output unit 45 by the CPU 241 which has executed the output control program 4431, and inputs output video data into the external input unit 36 of the server apparatus 3 through the cable C.

The CPU 241 functions as the setting section, the measurement section and the communication section by executing the setting program 4432 like this.

The external output unit 45 is connected with the external input unit 36 of the server apparatus 3 with the cable C.

To put it concretely, the external output unit 45 performs the external output of the video data output by the CPU 241 having executed the output control program 4431 as the setting section and the measurement section for instance.

<Measured Time Lag Setting Processing>

Next, the processing relative to the setting of a measured time lag by the client server system 3000 is described.

First, for instance, while the external output unit 45 of the client terminal apparatus 4 and the external input unit 36 of the server apparatus 3 are connected with each other with the cable C, the CPU 241 of the client terminal apparatus 4 executes the setting program 4432 to perform the external output of the video data from the external output unit 45, the video data having been output by the CPU 241 which has executed the output control program 4431, and to input the video data into the external input unit 36 of the server apparatus 3 through the cable C.

Then, for instance, when the client server system 3000 is instructed to measure the measured time lag by a user's operation of the remote control 341, the CPU 151 of the server apparatus 3 executes the setting program 3531, and measures a time period from the reproduction of a piece of the video data by the DVD/HDD reproduction unit 11 to input of the piece of the video data into the external input unit 36 as the measured time lag to make the storage unit 353 store the measured time lag therein.

<Reproduction Position Movement Processing>

Because the processing of the shifting of the reproduction position of video data by the client server system 3000 is the same as that of the client server system 1000 except for the respect in which the shifting distance of the reproduction position is determined based on the measured time lag in the client server system 3000, while the shifting distance of the reproduction position is determined based on a predicted time lag in the client server system 1000. Consequently, the detailed description relative to the reproduction position shifting processing is omitted.

According to the client server system 3000 of the present invention described above, the video data output by the CPU 241 having executed the output control program 4431 of the client terminal apparatus 4 can be output to the outside with the external output unit 45 installed on the client terminal apparatus 4 side, and the video data output from the external output unit 45 through the cable C can be input by the external input unit 36 installed on the server apparatus 3 side. Then, the CPU 151 having executed the setting program 3531 of the server apparatus 3 and the CPU 241 having executed the setting program 4432 of the client terminal apparatus 4 can set a time period from the reproduction of the video data by the DVD/HDD reproduction unit 11 to input of the video data into the external input unit 36 through the cable C as the measured time lag. And the CPU 151 having executed the control program 3532 controls the DVD/HDD reproduction unit 11 to enable the performance of the processing of shifting the reproduction position of video data to the reproduction position in the first reproduction mode, the latter reproduction position equivalent to the measured time lag set by the CPU 151 having executed the setting program 3531 of the server apparatus 3 and the CPU 241 having executed the setting program 4432 of the client terminal apparatus 4, when the second reproduction mode is selected by a user's operation of the remote control 341 during the reproduction operation by the DVD/HDD reproduction unit 11 in the first reproduction mode. Consequently, for instance, even if the time lag T differs by each of the client server systems 3000 owing to the individual differences of the client server systems 3000, the time lag T of each of the client server systems 3000 can be measured to be set as the measured time lag of each of the client server systems 3000, and the time lag T which the user feels actually at the time of a watching can be directly measured to be set as the measured time lag. Accordingly, the trouble prevention of a user's watching, the trouble being caused by the delay occurring at the time of the transmission of video data in a client server system 3000, can be more effectively achieved.

Third Embodiment

Next, a client server system 5000 according to a third embodiment is described.

<Configuration of Client Server System>

First, the configuration of the client server system 5000 is described with reference to FIG. 5.

In addition, the client server system 5000 of the third embodiment differs from the client server system 1000 of the first embodiment (see FIG. 1) in the reproduction position shifting processing. To put it concretely, the client server system 5000 differs from the client server system 1000 in the remote control 141 in the server apparatus 1, a part of the configuration of the remote control reception unit 14, a part of the configuration of the control unit 15 in the server apparatus 1, a part of the configuration of the client terminal apparatus 2, and a part of the configuration of the control unit 24 in the client terminal apparatus 2. Accordingly, description is given only to the different parts, and the other common parts are severally denoted by the common reference numbers and the detailed description of the common parts is omitted.

The client server system 5000 is composed of a server apparatus 5 and a client terminal apparatus 6. The server apparatus 5 and the client terminal apparatus 6 are connected with each other through the wireless network N, and are configured to be able to communicate with each other.

(Configuration of Server Apparatus)

Figure 5:
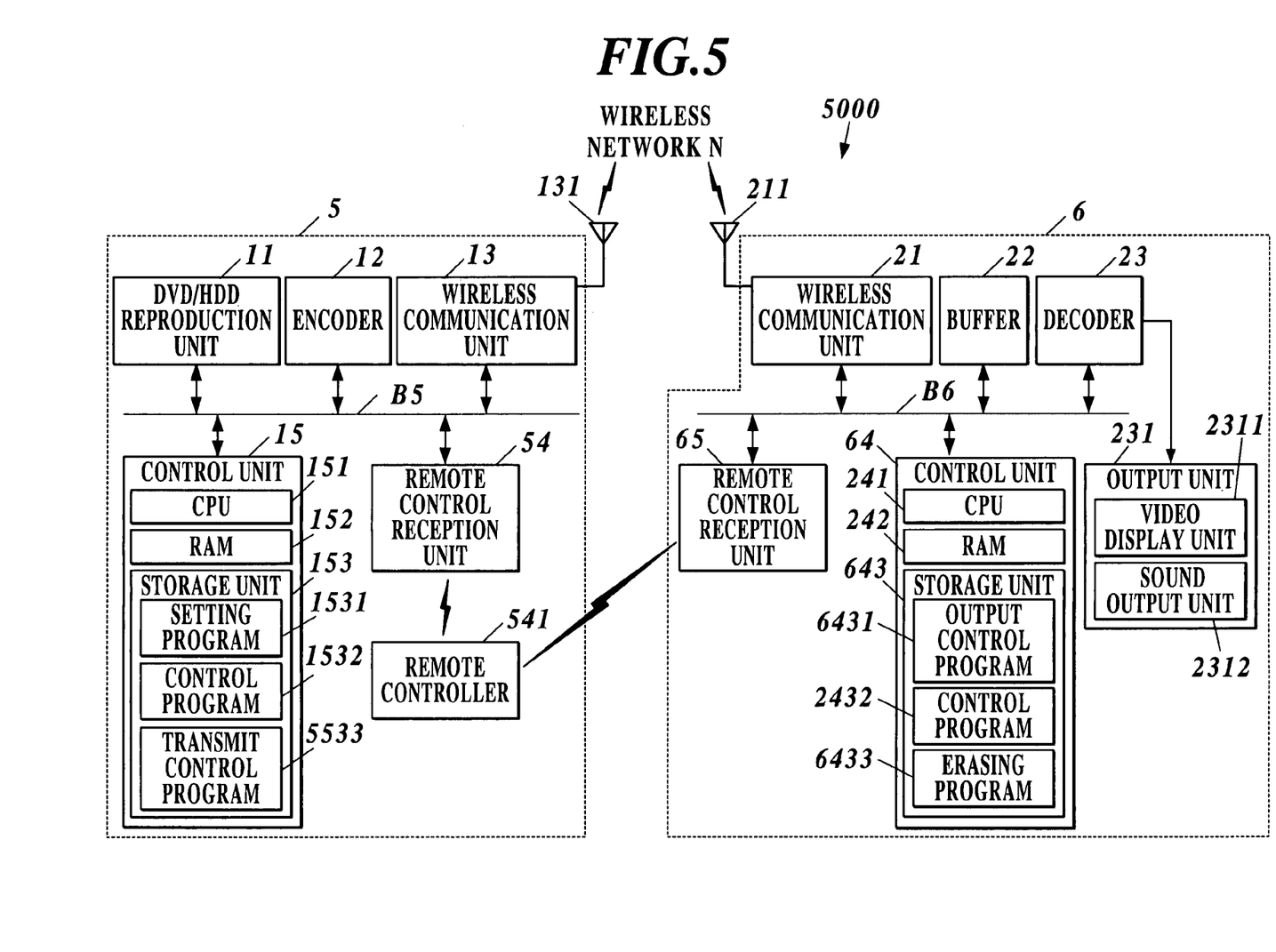
FIG. 5 is a diagram showing the whole configuration of a client server system according to a third embodiment.

The server apparatus 5 is composed of the DVD/HDD reproduction unit 11, the encoder 12, the wireless communication unit 13, a remote control reception unit 54, a control unit 55 and the like as shown in FIG. 5 for instance. Each unit is connected with each other through a bus B5. Moreover, the server apparatus 5 is also equipped with a remote controller 541 (hereinafter referred to as a "remote control 541") for the server apparatus 5.

The remote control reception unit 54 receives various signals transmitted from the remote control 541, for instance.

The remote control 541 is used when a user selects a reproduction mode by the DVD/HDD reproduction unit 11, for instance.

Moreover, the remote control 541 is used, for instance, when the user inputs a predicted time lag into the input space S1 displayed in the setting screen S (see FIG. 2).

In addition, the remote control 541 is configured to be able to transmit various signals also to a remote control reception unit 65 of the client terminal apparatus 6.

The control unit 55 includes the CPU 151, the RAM 152, a storage unit 553 and the like as shown in FIG. 5 for instance.

The storage unit 553 stores a system program executable in the server apparatus 5, various processing programs executable on the system program, the data to be used at the time of the execution of the various processing programs, the data of processed results of the operation processing by the CPU 151, and the like. In addition, the programs are stored in the storage unit 553 in the form of program codes readable by a computer.

To put it concretely, the storage unit 553 stores the setting program 1531, the control program 1532, a transmit control program 5533 and the like as shown in FIG. 5 for instance.

The transmission program 5531 makes the CPU 151 realize the function of prohibiting the transmission of the video data reproduced by the DVD/HDD reproduction unit 11 to the client terminal apparatus 6 during the processing of shifting the reproduction position of the video data by the CPU 151 having executed the control program 1532.

Moreover, the transmit control program 5533 makes the CPU 151 realize the function of processing the transmission of the video data reproduced by the DVD/HDD reproduction unit 11 in the second reproduction mode at a speed faster than the normal transmission speed until the video data reaches the video data storage capacity of the buffer 22 installed in the client terminal apparatus 6.

Hereupon, the normal transmission speed means a reproduction speed when the CPU 151 does not execute the transmit control program 5533, namely, for instance, a transmission speed when the video data reproduced in the first reproduction mode is transmitted from the server apparatus 5 to the client terminal apparatus 6.

(Configuration of Client Terminal Apparatus)

For instance, as shown in FIG. 5, the client terminal apparatus 6 is composed of the wireless communication unit 21, the buffer 22, the decoder 23 connected with the output unit 231, a control unit 64, the remote control reception unit 65 and the like. Each unit is connected with each other by a bus B6.

Hereupon, the client terminal apparatus 6 is configured to be able to be operated by the remote control 541 for the server apparatus 5.

The control unit 64 is equipped with the CPU 241, the RAM 242, a storage unit 643 and the like as shown in FIG. 5 for instance.

The storage unit 643 stores a system program executable in the client terminal apparatus 6, various processing programs executable on the system program, the data used at the time of the execution of the various processing programs, the data of the processed results of the operation processing by the CPU 241, and the like. In addition, the programs are stored in the storage unit 643 in the form of program codes readable by a computer.

To put it concretely, for instance as shown in FIG. 5, the storage unit 643 stores an output control program 6431, the setting program 2432, an erasing program 6433 and the like.

The output control program 6431 makes the CPU 241 realize the function of decoding the video data stored in the buffer 22 with the decoder 23 to output the decoded video data to the video display unit 2311 and the like included in the output unit 231.

Moreover, the output control program 6431 makes the CPU 241 realize the function of making the video display unit 2311 display an video (a still image) based on the video data displayed on the video display unit 2311 at the time point when the second reproduction mode was selected by a user's operation of the remote control 541 during the period from the selection of the second reproduction mode with the user's operation of the remote control 541 to the output of the video data to the video display unit 2311 and the like included in the output unit 231, the video data having been reproduced by the DVD/HDD reproduction unit 11 in the second reproduction mode.

The erasing program 6433 makes the CPU 241 realize the function of erasing from the buffer 22 the video data stored in the buffer 22 and reproduced in the first reproduction mode at the time point when the second reproduction mode was selected by the user's operation of the remote control 541 and the video data to be stored in the buffer 22 and reproduced in the first reproduction mode after the selection of the second reproduction mode by the user's operation of the remote control 541.

The remote control reception unit 65 receives various signals transmitted from, for instance, the remote control 541 for the server apparatus 5.

<Predicted Time Lag Setting Processing>

Because the processing relative to the setting of a predicted time lag by the client server system 5000 is the same as that by the client server system 1000, the detailed description of the processing is omitted.

<Reproduction Position Movement Processing>

The processing relative to the shifting of a reproduction position of video data by the client server system 5000 is described with reference to FIG. 6.

The video data a, b, c, . . . reproduced by the DVD/HDD reproduction unit 11 is wirelessly transmitted from the server apparatus 5 to the client terminal apparatus 6, and stored in the buffer 22 to be output from the output unit 231.

Figure 6:
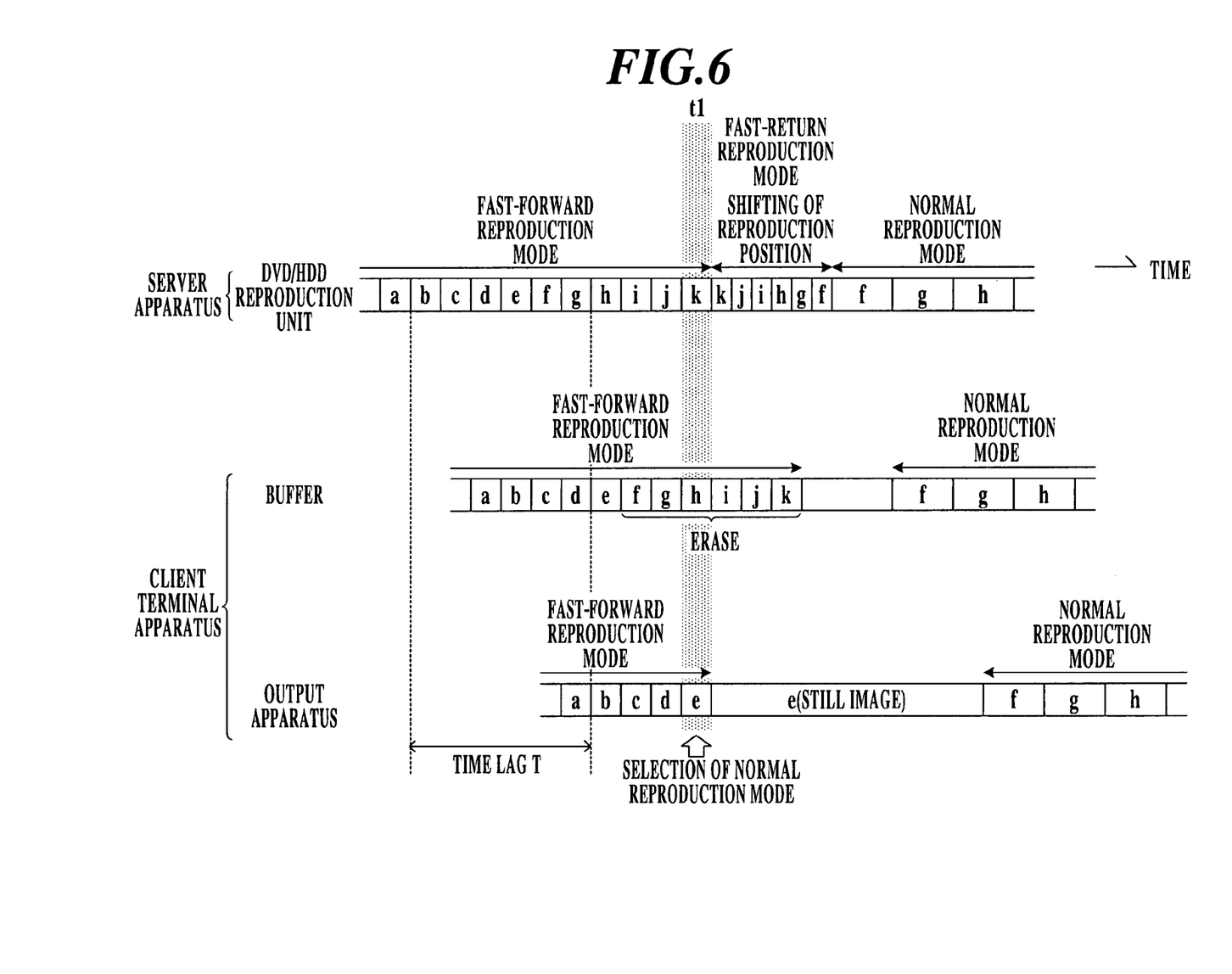
FIG. 6 is a view for illustrating the processing relative to the shifting of a reproduction position of video data by the client server system according to the third embodiment.

Regarding FIG. 6, description is given to a case where the second reproduction mode (the normal reproduction mode) is selected by a user's operation of the remote control 541 during the reproduction operation by the DVD/HDD reproduction unit 11 in the first reproduction mode (the fast-forward reproduction mode) similarly to the case shown in FIG. 3.

To put it concretely, description is given to the case where the normal reproduction mode is selected by the user's operation of the remote control 541 at the time point [t1] when the DVD/HDD reproduction unit 11 reproduces the video data k in the fast-forward reproduction mode and the output unit 231 outputs the video data e reproduced in the fast-forward reproduction mode, namely the case where the user wants to watch the video based on the video data following the video data e (the video data on and after the video data f) in the normal reproduction mode.

In addition, similarly to the case shown in FIG. 3, as a premise, it is supposed that the set predicted time lag, i.e. the predicted time lag stored in the storage unit 553, is consistent with the actual time lag T.

Here, similarly to the case shown in FIG. 3, in FIG. 6, the DVD/HDD reproduction unit 11 has reproduced six pieces of video data (video data b-g) in the fast-forward reproduction mode during the period equivalent to the time lag T (=the predicted time lag) which is from the reproduction of the video data (for instance, the video data a) by the DVD/HDD reproduction unit 11 to output thereof to the output unit 231.

When the normal reproduction mode is selected by the user's operation of the remote control 541 at the time point [t1] during the reproduction operation by the DVD/HDD reproduction unit 11 in the fast-forward reproduction mode, the CPU 151 of the server apparatus 5 executes the control program 1532 to control the DVD/HDD reproduction unit 11 to shift the reproduction position of the video data to a position six pieces of the video data (the video data k, j, i, h, g, f) returned from the video data k. That is, the pieces of the video data of from the video data k to the video data f are reproduced in the fast-rewind reproduction mode, and the video data on and after the video data f is reproduced in the normal reproduction mode.

In addition, the CPU 151 executes the transmit control program 5533 at the time point [t1], and controls the wireless communication unit 13 to prohibit the transmission of the video data (the video data k, j, h, g and f) reproduced by the DVD/HDD reproduction unit 11 in the fast-rewind reproduction mode to the wireless communication unit 21 of the client terminal apparatus 6 during the processing of the shifting of the reproduction position of the video data by the CPU 151 having executed the control program 1532. Then, when the video data is reproduced by the DVD/HDD reproduction unit 11 in the normal reproduction mode, the CPU 151 transmit the video data (the video data f, g, h, . . . ), which has been reproduced in the normal reproduction mode, at a speed faster than the normal transmission speed, namely at a speed faster than the speed of transmitting the video data (the video data a-k) reproduced in the fast-forward reproduction mode.

On the other hand, the CPU 241 of the client terminal apparatus 6 executes the erasing program 6433 at the time point [t1] to erase from the buffer 22 the video data (the video data f, g and h) reproduced in the fast-forward reproduction mode, which video data is stored in the buffer 22 at the time point [t1], and the video data (the video data i, j and k) to be stored in the buffer 22 after the time point [t1], which video data is reproduced in the fast-forward reproduction mode.

Moreover, at the time point [t1], the CPU 241 having executed the output control program 6431 makes the video display unit 2311 display the still image based on the video data (the video data e) displayed on the video display unit 2311 at the time point [t1] during the period of from the time point [t1] to the output of the video data (the video data on and after the video data f) reproduced in the normal reproduction mode, which video data is stored in the buffer 22, to the video display unit 2311 and the like included in the output unit 231.

In addition, because the reproduction speeds differ according to the kinds of the reproduction modes similarly to the case shown in FIG. 3, the number of the pieces of the video data to be reproduced during a period equivalent to the time lag T differs according to the kinds of the reproduction modes. Consequently, the shifting distance of the reproduction position also differs according to the kind of the first reproduction mode.

According to the client server system 5000 of the present invention described above, the client server system 5000 can receive various signals transmitted from the remote control 541 for the server apparatus 5 with the remote control reception unit 65. Then, the CPU 151 having executed the transmit control program 5533 of the server apparatus 5 controls the wireless communication unit 13 to enable the performance of the processing of prohibiting the transmission of the video data reproduced by the DVD/HDD reproduction unit 11 to the client terminal apparatus 6 during the processing of the shifting of the reproduction position of the video data by the CPU 151 having executed the control program 1532. And the CPU 241 having executed the erasing program 6433 of the client terminal apparatus 6 can erase from the buffer 22 the video data reproduced in the first reproduction mode, which video data is stored in the buffer 22 at the time point when the second reproduction mode is selected by the user's operation of the remote control 541. And the video data reproduced in the first reproduction mode, which video data is to be stored in the buffer 22 after the selection of the second reproduction mode of the user's operation of the remote control 541. The CPU 241 having executed the output control program 6431 of the client terminal apparatus 6 can make the decoder 23 decode the video data stored in the buffer 22 to output the decoded video data to the video display unit 2311 and the like included in the output unit 231, and can make the video display unit 2311 display an video (a still image) based on the video data displayed on the video display unit 2311 at the time point of the selection of the second reproduction mode by the user's operation of the remote control 541 during the period of from the selection of the second reproduction mode by the user's operation of the remote control 541 to the output of the video data reproduced by the DVD/HDD reproduction unit 11 in the second reproduction mode to the video display unit 2311 and the like included in the output unit 231. Consequently, the user can watch the video based on the video data reproduced in the reproduction mode which the user desires from the reproduction position which the user desires without watching the video reproduced in the first reproduction mode and the video based on the video data to be reproduced at the time of the shifting of the reproduction position, after the selection of the second reproduction mode.

Moreover, the CPU 151 having executed the transmit control program 5533 controls the wireless communication unit 13 to perform the processing of transmitting the video data reproduced by the DVD/HDD reproduction unit 11 in the second reproduction mode at a speed faster than the speed of the normal transmission until the video data reaches the video data storage capacity of the buffer 22 installed in the client terminal apparatus 6. Consequently, because the video data which the user desires and has been reproduced in the reproduction mode which the user desires can be rapidly output, the trouble prevention of the user's watching, the trouble being caused by the delay occurring at the transmission of the video data in the client server system 5000, can be more effectively achieved.

In addition, the present invention is not restricted to the embodiments described above, and can be suitably modified in a range without departing from the scope of the invention.

The reproduction sections included in the server apparatus 1, 3 and 5 in the first to the third embodiments are not limited to the DVD/HDD reproduction units 11, and arbitrary reproduction sections can be used as long as the reproduction sections are suitable AV equipment (such as a video cassette recorder (VCR) reproducer and the like) capable of reproducing accumulated video data in predetermined reproduction modes including the normal reproduction mode, the fast-forward reproduction mode, the fast-rewind reproduction mode and the pause reproduction mode.

Moreover, although the DVD/HDD reproduction units 11 are installed in the server apparatus 1, 3 and 5 in the first to the third embodiments, the DVD/HDD reproduction units 11 and the server apparatus 1, 3 and 5 may be formed as separated bodies, and the DVD/HDD reproduction units 11 may be connected to the server apparatus 1, 3 and 5.

Similarly, although the output units 231 including the video display units 2311 and the like are installed in the client terminal apparatus 2, 4 and 6 in the first to the third embodiments, the output units 231 and the client terminal apparatus 2, 4 and 6 may be configured to be separated bodies, and the output units 231 may be connected to the client terminal apparatus 2, 4 and 6.

Although the video data reproduced by the DVD/HDD reproduction unit 11 is made to be returned from the client terminal apparatus 4 to the server apparatus 3 with the cable C at the time of the measurement of the measured time lag in the second embodiment, the video data may be returned by wireless, for instance. In this case, it is preferable to use the wireless communication unit 21 installed in the client terminal apparatus 4 and the wireless communication unit 13 installed in the server apparatus 3.

Moreover, the measurement method of the measured time lag is not limited to the method of the second embodiment, and arbitrary methods may be used as long as the methods are suitable.

Although the predicted time lag is made to be stored in the storage unit 553 to be set in the third embodiment similarly to the first embodiment, the measured time lag may be made to be stored in the storage unit 553 to be set similarly to the second embodiment.

Although the first reproduction mode is the fast-forward reproduction mode and the second reproduction mode is the normal reproduction mode in the reproduction position shifting processing (see FIG. 3) of the first embodiment and in the reproduction position shifting processing (see FIG. 6) of the third embodiment, the first reproduction mode is not limited, as long as it is any one of the fast-forward reproduction mode, the fast-rewind reproduction mode and the normal reproduction mode, and the second reproduction mode is not limited, as long as it is a reproduction mode different from the first reproduction mode and is either of the normal reproduction mode and the pause reproduction mode.

The entire disclosure of Japanese Patent Application No. 2005-265400 filed on Sep. 13, 2005, including description, claims, drawings and summary are incorporated herein by reference.

What is claimed is:

1. A client server system comprising:
a server apparatus equipped with a reproduction section to reproduce accumulated video data in a predetermined reproduction mode including a normal reproduction mode, a fast-forward reproduction mode and a fast-rewind reproduction mode, and a transmission section to transmit the video data reproduced by the reproduction section;
a client terminal apparatus connected with the server apparatus through a wireless network equipped with a reception section to receive the video data transmitted by the transmission section, a storage section to store the video data received by the reception section sequentially, and an output control section to output the video data stored in the storage section to a display unit;
a selection section to select the reproduction mode of the reproduction section; a setting section to set a time lag; and
a control section to shift a reproduction position of video data in the first reproduction mode by the time lag set by the setting section, when a second reproduction mode is selected by the selection section during a reproduction operation by the reproduction section in the first reproduction mode,
wherein the setting section comprises a setting screen display control section to allow the display unit to display a setting screen,
an input section to input the time lag into an input space displayed in the setting screen; and
a measurement section to measure a time period from reproduction of the video data by the reproduction section to input of the video data into an external input unit through a communication section, the measurement section including:
an external output unit installed in the client terminal apparatus, to output the video data output by the output control section to an outside;
the external input unit installed in the server apparatus, to input video data output by the external output unit; and
the communication section to connect the external output unit with the external input unit, wherein the setting section sets the time period measured by the measurement section as the time lag.

2. A client server system comprising:
a server apparatus equipped with a reproduction section to reproduce accumulated video data in a predetermined reproduction mode including a normal reproduction mode, a fast-forward reproduction mode and a fast-rewind reproduction mode, and a transmission section to transmit the video data reproduced by the reproduction section;
a client terminal apparatus connected with the server apparatus through a wireless network equipped with a reception section to receive the video data transmitted by the transmission section, a storage section to store the video data received by the reception section sequentially, and an output control section to output the video data stored in the storage section to a display unit;
a selection section to select the reproduction mode of the reproduction section;
a setting section to set a time lag; and
a control section to shift a reproduction position of video data in the first reproduction mode by the time lag set by the setting section, when a second reproduction mode is selected by the selection section during a reproduction operation by the reproduction section in the first reproduction mode,
wherein the setting section comprises a measurement section to measure a time period from reproduction of the video data by the reproduction section to input of the video data into an external input unit through a communication section, the measurement section including:
an external output unit installed in the client terminal apparatus, to output the video data output by the output control section to an outside;
the external input unit installed in the server apparatus, to input Video data output by the external output unit; and
the communication section to connect the external output unit with the external input unit,
wherein the setting section sets the time period measured by the measurement section as the time lag.

* * * * *

UNITED STATES PATENT AND TRADEMARK OFFICE
CERTIFICATE OF CORRECTION

PATENT NO. : 7,657,647 B2  Page 1 of 1
APPLICATION NO. : 11/519004
DATED : February 2, 2010
INVENTOR(S) : Takehiro Onomatsu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 784 days.

Signed and Sealed this

Fourth Day of January, 2011

David J. Kappos
*Director of the United States Patent and Trademark Office*